United States Patent [19]

Van Breen et al.

[11] Patent Number: 4,861,428
[45] Date of Patent: Aug. 29, 1989

[54] REINFORCED POLYMER SHEET

[75] Inventors: Adriaan W. Van Breen; Johannes C. M. Gillemans, both of Amsterdam, Netherlands

[73] Assignee: Shell Oil Company, Houston, Tex.

[21] Appl. No.: 172,895

[22] Filed: Mar. 25, 1988

[30] Foreign Application Priority Data

Mar. 27, 1987 [GB] United Kingdom ............... 8707404

[51] Int. Cl.$^4$ ............................................. D21H 3/38
[52] U.S. Cl. ................................ 162/168.1; 162/145; 162/146
[58] Field of Search .................. 162/164.1, 168.1, 169, 162/145, 146

[56] References Cited

U.S. PATENT DOCUMENTS

| | | | |
|---|---|---|---|
| 3,325,345 | 6/1967 | Hider | 162/169 |
| 4,426,470 | 1/1984 | Nessling et al. | 524/35 |
| 4,431,696 | 2/1984 | DiDrusco et al. | 428/212 |
| 4,550,131 | 10/1985 | Yats | 524/35 |
| 4,612,251 | 9/1986 | Fredenucci et al. | 428/511 |
| 4,615,717 | 10/1986 | Neubauer et al. | 65/44 |
| 4,692,375 | 9/1987 | Neubauer et al. | 428/299 |

FOREIGN PATENT DOCUMENTS

| | | |
|---|---|---|
| 0039292 | 11/1981 | European Pat. Off. . |
| 0121965 | 4/1983 | European Pat. Off. . |
| 0181014 | 5/1986 | . |
| 2507123 | 6/1981 | France . |
| 1263812 | 2/1972 | United Kingdom . |

*Primary Examiner*—Peter Chin
*Attorney, Agent, or Firm*—Dean F. Vance

[57] ABSTRACT

A process for producing a fiber reinforced polymer sheet by paper-making technology starting from an aqueous dispersion of thermoplastic polymer particles and fibers having a minimum length of 2.0 mm, characterized in that the polymer is an alternating copolymer of ethylene and carbon monoxide with an average weight molecular weight of at least 6000 and the fibers are used in an amount of from 5 to 450 pbw per 100 pbw of polymer.

8 Claims, No Drawings

REINFORCED POLYMER SHEET

BACKGROUND OF THE INVENTION

This invention is concerned with a process for producing reinforced polymer sheet by paper-making technology, starting from an aqueous dispersion of a particulate thermoplastic polymer and reinforcing fibers having a minimum length of 2 mm.

It is known to produce fiber reinforced polymer articles of manufacture by various methods, e.g. melt-extrusion of a fiber-containing polymer composition to form sheet, film, slabs, tubes, piping, profiles etc., calendering of similar compositions to form sheet or film, injection-molding, blow-molding and compression-molding of similar compositions to form molded objects, particularly those having a reduced wall-thickness, e.g. cups, bottles and other containers. Such techniques present no particular problems provided staple fibers of relatively short length, i.e. having a length of less than 2 mm, are employed. With longer fibers very few of the above techniques are to date practiced on a truly commercial scale since there are very restricted possibilities for achieving the desired degree of homogeneity in the mixture of fiber and polymer at the moment the molding or shaping is about to be effected. Since the reinforcing effect is a function of fiber length, there exists a general incentive to employ longer fibers, e.g. having a length of at least 5 mm. The process as used by Azdel Inc., disclosed in U.S. Pat. Nos. 4,692,375 and 4,615,717, comprises impregnation of a mat of glass fiber strands with a hot molten thermoplastic resin from an extruder, and cooling the resin to form a finished fiber reinforced thermoplastic resin sheet. The product of this process is a flat composite sheet having good tensile strength in the longitudinal direction of the sheet.

It has been proposed to solve the problem related to the processing of long reinforcing fibers in thermoplastics by a completely different technology which is a paper-making process based upon using a thermoplastic polymer in particulate form e.g. a powder or granules, ground down to a very small particle size, as a binder for the fibers. Thus, a paper is produced when the fibers are cellulose fibers, or a paper-like material or synthetic paper can be produced from metal fibers, glass fibers, carbon fibers, nylon fibers, polyamid fibers, etc.

The commercial development of this different technology basically hinges around the use of olefin polymers, e.g. polyethylene, polypropylene or polybutene as the binding polymer. EP-A 6930, EP-A 100720, EP-A 180863 and FR-A 2530724). The binding performance of such polyolefins is however rather poor, most likely due to their hydrophobic properties. Typically, it is necessary to use various surfactants, detergents or flocculating agents in order to improve wettability performance of the polyolefins. These auxiliary agents may even have to be employed at different stages of the paper-making process, which significantly complicates the technology. There is thus a need to find a simplified process for making paper.

Unexpectedly, the Applicants have found that another thermoplastic polymer has a good wettability and that there is no strict need to employ the auxiliary agents referred to hereinabove. This polymer is an alternating copolymer of carbon monoxide and an olefinically unsaturated compound, with a molecular weight of at least 2000, and more preferably at least 6000, known as polyketone.

The present invention differs from the Azdel process in that it (A) comprises staple fibers instead of a mat of fiber strands, (B) dispenses an aqueous suspension of grinded polymer together with fibers onto a filter and thereafter removing the water and drying at elevated temperature the self-supporting sheet of reinforced polymer, and (C) compression molds the preform. The product of the present invention is a reinforced, optionally shaped, polymer article. Furthermore, the polymer of the present invention is an alternating copolymer of olefinically unsaturated compounds and carbon monoxide which are very suitable for this process.

SUMMARY OF THE INVENTION

The present invention is concerned with a process for producing a fiber reinforced polymer sheet by paper-making technology, starting from an aqueous dispersion of a particulate thermoplastic polymer and reinforcing fibers with a length of at least 2.0 mm, characterized in that the polymer is an alternating copolymer of carbon monoxide and an olefinically unsaturated compound with an average molecular weight of at least 6000, and more preferably at least 2000, with the fibers so employed, in an amount of from 5 to 450 pbw per 100 pbw of copolymer, preferably in an amount of from 20 to 200 pbw per 100 pbw of copolymer.

The particle size of the copolymer should be such that adequate handling of the product in the machinery is obtained. Both the presence of particles which are too small or too large for this purpose is to be avoided. Preferred particle sizes are of from 0.01 to 0.75 mm, best of all selected in the range of from 0.05 to 0.30 mm. Preferred fiber lengths are at least 4.5 mm.

DETAILED DESCRIPTION

Alternating copolymers of olefinically unsaturated compounds and carbon monoxide are known per se. They can be produced with a catalytic copolymerization process disclosed for example in EP-A 121965, and EP-A 181014.

The term "copolymer" as used in this specification includes terpolymers of an olefinically unsaturated compound, e.g. ethylene, carbon monoxide and another olefinically unsaturated compound such as styrene, norbornene, propylene, butene-1, decene, and vinylacetate. If terpolymers are used herein, terpolymers with melting points of 215° C. to 240° C. are preferred.

The term "alternating" as used herein defines those copolymers having the general formula $\pm[A-CO]_n$, and wherein each —CO-unit in the macromolecular chains is bound left and right to a monomer unit —A—, which is —$CH_2$—$CH_2$— in a copolymer of ethylene and cabon monoxide. In a terpolymer some of the —$CH_2$—$CH_2$— units in that formula can be replaced by a unit of another olefinically unsaturated compound. Such substitution effects a lowering of the melting point of the ethylene/carbon monoxide copolymer, preferred terpolymers are those of ethylene, propylene and carbon monoxide having a melting point in the range of from 215° to 240° C.

The implementation of the process of this invention presents no problems to those skilled in the art. The process of this invention is a wet-laid aqueous technique. Similar processes are disclosed in U.S. Pat. Nos. 4,426,470 and 4,431,696, U.K. Pat. No. 1,263,812, French Patent Publication No. 2,507,123, and European Patent Publication No. 0,039,292. A homogeneous dispersion in water of reinforcing fibers and the novel thermoplastic polymer particles is brought on the filtering equipment of a paper-making machine, the water is drained-off, thus yielding after drying at elevated temperature a self-supporting sheet of reinforced polymer. Suitable paper-making machine can be Beloit Continuous Pulp Machine, a Fourdrinier Machine or a Cylinder Machine. For further processing, several of these sheets can be stacked together and compression molded at a temperature around or above the melting point of the polymer.

Compression-molding can also be carried out with stacked sheets that have been united to form one coherent sheet of increased thickness in a previous forming operation, e.g. calendering, in which use may be made of adhesive films or coatings on the various layers of sheets.

C. and an intrinsic viscosity of 1.01 dl.g$^{-1}$, was stirred to a dense suspension in demineralized water not containing any surfactant or flocculant. Then various fibers were added as indicated in the Table below, all fibers had a length of 6 mm. the fibers were defibrillated by continuous, vigorous stirring of the suspension having a solids content of 1 g.l$^{-1}$. The suspension was poured onto a filter, water was drained off and the resulting, selfsupporting sheet was positioned between two layers of filter paper forming an assembly. The assembly was rolled with a heavy roller to absorb most of the water in the wet sheet. Final drying was effected by drying overnight at ambient temperature and in a vacuum under $N_2$ at 50° C. for 3 hours.

Each single sheet was compression-molded in a hot press using 1 mm thick metal supports. The molding conditions used herein are detailed on the following Table I.

TABLE I

| | Compression Molding Conditions | | | |
|---|---|---|---|---|
| | POLYKETONE (REFERENCE) | POLYKETONE GLASSFIBER | POLYKETONE ARAMID FIBER | POLYKETONE CARBON FIBER |
| Single Sheet | | | | |
| Preheating | | | | |
| Time (Min.) | 0.5 | 1 | 0.5 | 1 |
| Temp (°C.) | 235 | 235 | 235 | Z35 |
| Press. (Tons) | 1.5$^1$ | 1.5 | 1.4 | 1.5 |
| Compression Molding | | | | |
| Time (Min.) | 0.5 | 0.5 | 0.5 | 0.5 |
| Temp (°C.) | 235 | 235 | 235 | 235 |
| Press. (Tons) | 4 | 15 | 7.2 | 15 |
| Cooling | | | | |
| Temp. | R.T. | R.T. | R.T. | R.T. |
| Press. (Tons) | 4 | 15 | 7.2 | 15 |
| Preheating in an Oven | | | | |
| 10 Min, 110° C. | No | Yes | Yes | Yes |
| Test Sheet | | | | |
| Preheating | | | | |
| Time (Min.) | 0.5 | 1 | 0.5 | 1 |
| Temp (°C.) | 235 | 235 | 235 | 235 |
| Press. (Tons) | 1.5$^2$ | 1.5 | 1.4 | 3 |
| Compression Molding | | | | |
| Time (Min.) | 0.75 | 0.5 | 0.5 | 0.5 |
| Temp (°C.) | 235 | 235 | 235 | 235 |
| Press (Tons) | 4 | 15 | 7.2 | 30 |
| Cooling | | | | |
| Temp. | R.T. | R.T. | R.T. | R.T. |
| Press (Tons) | 4 | 15 | 7.2 | 30 |

$^1$Initial surface area ca. 100 CM2.
$^2$Surface area after first time compression molding.
Four compression-molded sheets were stacked, preheated in an oven at 110° C. and once more compression-molded at 235° C. to obtain a test-sheet with a thickness of 0.7 to 1.0 mm.

The reinforced copolymer compositions of this invention may further comprise various additives such as fillers, colorants, plasticizers, thermostabilizers or antioxidants. Other polymeric constituents may be incorporated as well, for example polyethylene or polypropylene and it is also possible to use hybrids for the reinforcing fibers.

The invention is illustrated herein with Examples which are not intended to restrict the scope of the working conditions for practicing the process of the invention.

EXAMPLES

A powder of an ethylene/propylene/carbon monoxide terpolymer, with a crystalline melting point of 221°

For reference purpose, single sheets of terpolymer were produced by compression-molding terpolymer powder at the same temperature indicated above. Four sheets so obtained were then stacked and compression-molded at 235° C. to obtain a test-sheet with a thickness of 0.7 to 1.0 mm. In table II which follows, the reported amounts of fiber are pbw per 100 pbw of terpolymer.

TABLE II

| Fibers | None | Glass | Polyaramid | Carbon |
|---|---|---|---|---|
| Amount | 0 | 33 | 18.5 | 24.5 |
| Tensile strength, MPa | 50 | 120 | 125 | 150 |
| E-modulus, Gpa | 1.7 | 5.1 | 4.6 | 10.1 |

All molded samples of reinforced polymer showed a homogeneous distribution of fibrillated fibers in the polymer matrix.

What is claimed is:

1. A process for producing a fiber reinforced polymer sheet by paper-making technology comprising:
   (a) mixing particles of a thermoplastic polyketone polymer and water to form an aqueous dispersion of thermoplastic polymer particles and fibers having a minimum length of 2.0 mm, said polyketone polymer being an alternating copolymer of carbon monoxide and an olefinically unsaturated compound with an average molecular weight of at lest 2000 and having recurring units $\{A-CO\}$ where A represents the olefinicially unsaturated compound polymerized therein;
   (b) passing said aqueous dispersion onto a filter; and
   (c) draining the water from the dispersion, characterized in that the fibers are used in an amount of from 5 to 450 pbw per 100 pbw of polymer.

2. The process as claimed in claim 1, wherein the molecular weight of the copolymer is at least 6000.

3. The process as claimed in claim 1, wherein said fibers comprise from 20 to 200 pbw per 100 pbw of polymer.

4. The process as claimed in claim 1, wherein the particle size of the copolymer is within the range of 0.01 to 0.75 mm.

5. The process as claimed in claim 4, wherein the particle size of the copolymer is within the range of 0.05 to 0.30 mm.

6. The process as claimed in claim 1, wherein the copolymer is a terpolymer of ethylene, carbon monoxide and another olefinically unsaturated compound.

7. The process as claimed in claim 6, wherein said terpolymer has a melting point of from 215° to 240° C.

8. The process as claimed in claim 1, wherein the copolymer is a copolymer of ethylene and carbon monoxide.

* * * * *